United States Patent
Fitzgibbons

(10) Patent No.: US 11,161,566 B1
(45) Date of Patent: Nov. 2, 2021

(54) DRIVE SYSTEMS FOR BICYCLES

(71) Applicant: Floyd Fitzgibbons, Fort Duchesne, UT (US)

(72) Inventor: Floyd Fitzgibbons, Fort Duchesne, UT (US)

(73) Assignee: Floyd Fitzgibbons, ort Duchesne, UT (US)

( * ) Notice: Subject to any disclaimer, the term of this patent is extended or adjusted under 35 U.S.C. 154(b) by 177 days.

(21) Appl. No.: 16/730,629

(22) Filed: Dec. 30, 2019

Related U.S. Application Data

(60) Provisional application No. 62/787,503, filed on Jan. 2, 2019.

(51) Int. Cl.
| | |
|---|---|
| *B62M 1/10* | (2010.01) |
| *B62J 1/02* | (2006.01) |
| *B62M 1/24* | (2013.01) |
| *B62K 3/06* | (2006.01) |
| *B62M 3/08* | (2006.01) |
| *B62M 15/00* | (2006.01) |

(52) U.S. Cl.
CPC ............... *B62M 1/10* (2013.01); *B62J 1/02* (2013.01); *B62K 3/06* (2013.01); *B62M 1/24* (2013.01); *B62M 3/08* (2013.01); *B62M 15/00* (2013.01)

(58) Field of Classification Search
CPC . B62M 1/10; B62M 1/24; B62M 1/18; B62M 1/20; B62M 1/30; B62J 1/02
USPC ........................................ 280/216, 252, 254
See application file for complete search history.

(56) References Cited

U.S. PATENT DOCUMENTS

| | | |
|---|---|---|
| 597,466 A | 1/1898 | Hansard |
| 602,618 A | 4/1898 | Eyster |
| 614,992 A | 11/1898 | Schmidt |
| 719,595 A | 2/1903 | Huss |
| 735,628 A | 8/1903 | Waxel |
| 1,650,450 A | 11/1927 | Jochum |
| 4,568,097 A | 2/1986 | Farooq |
| 6,237,928 B1 | 5/2001 | Islas |
| 6,412,802 B1 | 7/2002 | Kugel et al. |
| 6,723,029 B2 | 4/2004 | Salgado |
| 8,840,127 B2 | 9/2014 | Musgrove |

(Continued)

FOREIGN PATENT DOCUMENTS

| | | | |
|---|---|---|---|
| WO | WO-9622911 A1 * | 8/1996 | .............. B62M 1/30 |
| WO | WO2017/024415 | 2/2017 | |

OTHER PUBLICATIONS

Matt Phillips, CeramicSpeed's Driven Concept Might Become the World's Most Efficient Drivetrain, [online] https://www.bicycling.com/bikes-gear/a22092182/ceramicspeeds-driven-concept-might-become-the-words-most-efficient-drivetrain; Jul. 9, 2018.

*Primary Examiner* — Minnah L Seoh
*Assistant Examiner* — Hosam Shabara
(74) *Attorney, Agent, or Firm* — Workman Nydgegger

(57) ABSTRACT

A bicycle includes a frame having a seat tube, a rear wheel including a drive plate, and a drive system configured to drive rotation of the rear wheel. The drive system includes at least one shaft operably extending in a direction between the seat tube and the rear wheel and arranged to interact with the drive plate. A pair of drive assemblies are located near or at least in part inside the seat tube and are arranged to operably interact with the drive shaft. The at least one drive shaft converts linear motion of the drive assemblies into rotation of the rear wheel without a chain or chainring.

16 Claims, 5 Drawing Sheets

(56) References Cited

U.S. PATENT DOCUMENTS

| | | |
|---|---|---|
| 9,079,632 B2 | 7/2015 | Gendell |
| 10,894,577 B2 * | 1/2021 | Smith .................... B62M 11/08 |
| 2019/0300116 A1 | 10/2019 | Smith et al. |

* cited by examiner

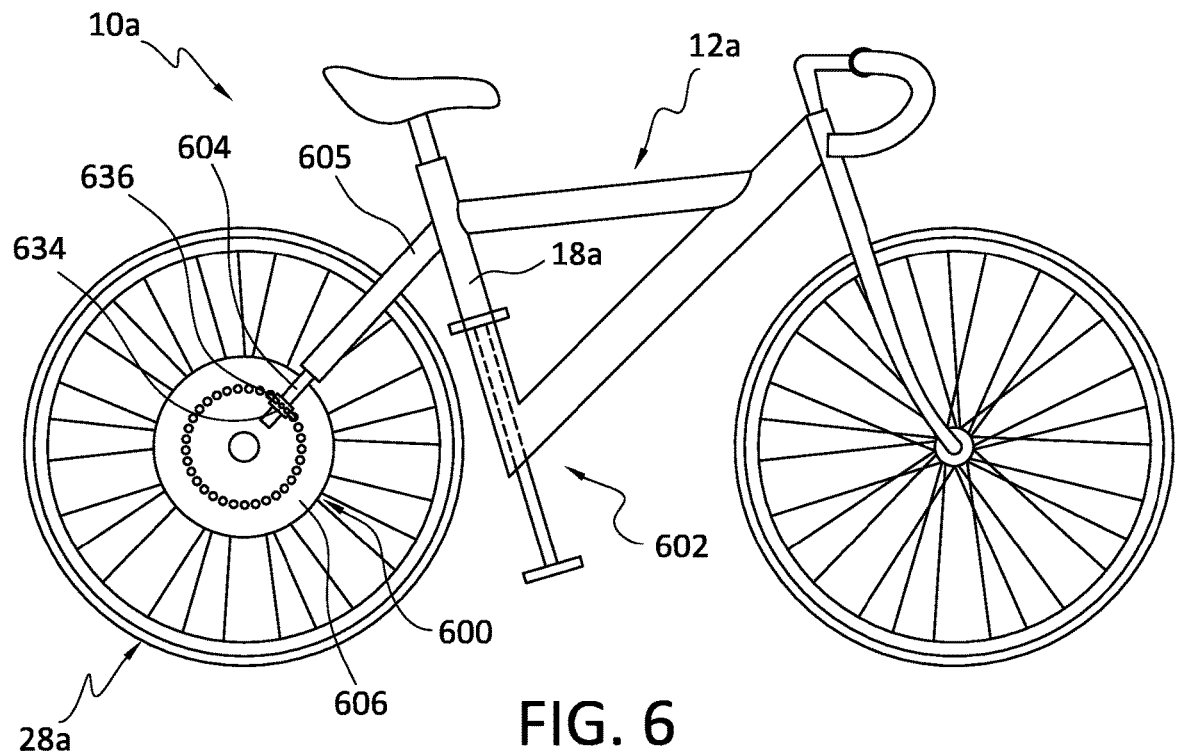
FIG. 6
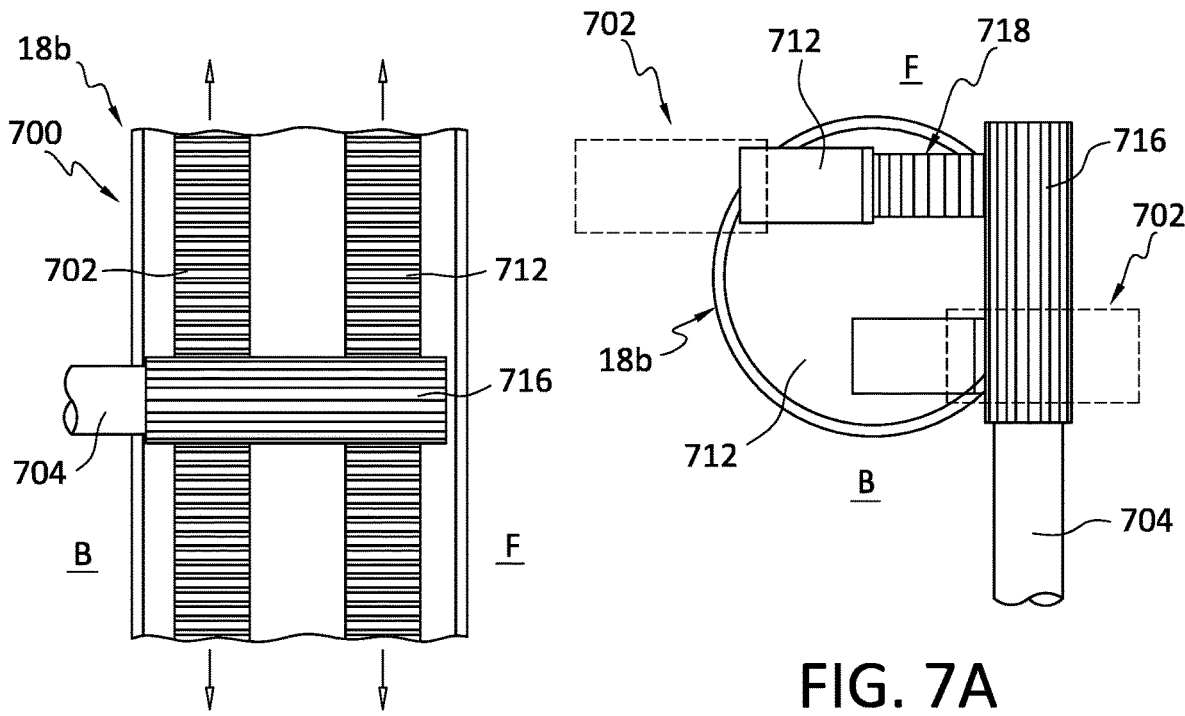
FIG. 7
FIG. 7A

DRIVE SYSTEMS FOR BICYCLES

TECHNICAL FIELD

The disclosure relates to a drive system for use in a bicycle.

BACKGROUND

Bicycles generally include a pedal drive system wherein a rider rotates a crankshaft by applying force against pedals connected to crank arms with the rider's feet. The drive system includes a forward sprocket, or chainring, attached to the crankshaft and a rear sprocket, or cog, linked to the forward sprocket by a tension chain or cable. Opposing crank arms extend from opposite sides of the forward sprocket, and pedals are pivotally attached to each crank arm end. The rider then rotates the forward sprocket in one angular direction by applying revolutionary force against the pedals. As the sprocket rotates, the tension chain or cable causes the rear sprocket to turn. When the rear sprocket is linked to a wheel, forward motion is achieved.

Conventional pedal drive systems of the types described above have several drawbacks. One problem associated with such systems, and particularly conventional bicycles, relates to the ability of a rider to revolve the rider's leg against the pedals. For instance, a rider's legs must travel in a circle as each crank arm rotates about the crankshaft in the bottom of the bicycle. Movement of the rider's leg from the three o'clock position to the six o'clock position (when the leg is most extended and has more leverage and power available) is approximately 23% shorter than the distance the leg moves from the twelve o'clock to the three o'clock position (when the rider's leg is most contracted and less leveraged). As such, when the rider's leg is most extended and powerful, the circular motion of the rider's legs on the pedals can cause a rider to lose more than one-fifth of his or her power output.

Another problem associated with conventional pedal drive systems relates to awkward movements of the rider's legs and feet. In conventional drive systems, the rider's foot and leg move inward and backward from the three o'clock position to the six o'clock position as the rider pedals, which can be awkward and inefficient.

Some attempts have been made to supplement or improve conventional pedal drive systems with motorized and electric drive units. However, such systems tend to be heavy, bulky, and complicated.

Accordingly, there is a need for a drive system for bicycles that incorporates certain design improvements over other systems for more efficient operation of a bicycle.

SUMMARY

Embodiments of the present disclosure advantageously provide drive systems for bicycles that allow for more efficient operation of a bicycle.

According to a variation, a bicycle includes a frame having a seat tube, a rear wheel including a drive plate, and a drive system configured to drive rotation of the rear wheel. The drive system includes at least one shaft operably extending a direction between the seat tube and the rear wheel and arranged to interact with the drive plate. A pair of drive assemblies are located near or at least in part inside the seat tube and are arranged to operably interact with the drive shaft. The at least one drive shaft converts linear or substantially linear motion or motion of the drive assemblies into rotation of the rear wheel without a chain or chainring.

In use, a rider positions his or her legs on opposite sides of the frame, with his or her feet positioned on the pedal members of the drive assemblies. The rider depresses one pedal member, which, in turn, causes the drive assembly to move linearly or down. The interaction between the drive assembly and the at least one drive shaft is such that the linear or downward movement of the drive assembly causes the at least one drive shaft to rotate, which in turn, rotates and transmits power to the rear wheel and moves the opposing drive assembly linearly or upwardly.

When the pedal member reaches the bottom of its stroke, the pedal member is in a readily depressible position. The rider then pushes down on the other pedal member and the opposing drive assembly causes the at least one drive shaft to rotate. This transmits power to the rear wheel in the same manner as previously described.

In this manner, a driving force is applied to the rear wheel when either the left or right pedal members is moved linearly or pushed downwardly. The rider's full force is applied vertically downward on the pedal members and transmitted through the at least one drive shaft to the rear wheel. This more efficiently transfers energy from the rider to the rear wheel than in prior art rotary pedaling systems.

In addition, the drive system can provide the rider the capability to choose the travel distance of each pedal member in each stroke. For instance, where terrain is steep, or the rider is tired, the rider can make a shorter, more leveraged pedal stroke. This advantageously eliminates the need for a long, circular stroke, with much of the pedaling motion finding the rider's legs contracted and poorly leveraged.

According to a variation, the drive system can replace a seat stay and/or chain stay of frame. This beneficially reduces the weight of the frame and can provide shock absorption to the rider via the drive system.

According to a variation, the drive system comprises a fluid drive system arranged to compress and store fluid (e.g., air) inside the frame. For instance, the fluid drive system can include pistons operably connected to the pedal members and arranged to compress and store air inside the frame, permitting a rider to safely and efficiently store kinetic energy when descending a grade, braking, or at any other time as desired. The stored energy can then be used during descents, acceleration, or simply to add supplemental power at the command of the rider. By utilizing compressed fluid or air inside of the frame to store and supply energy, the fluid drive system provides a lightweight energy source. Further, the need for heavy, expensive, and complicated components such as prior art batteries and motors is eliminated or significantly reduced, improving the efficiency of the bicycle.

BRIEF DESCRIPTION OF THE DRAWINGS

These and other features, aspects, and advantages of the present disclosure will become better understood regarding the following description, appended claims, and accompanying drawings.

FIG. 6 is a side view of a bicycle including a drive system according to another embodiment.

FIG. 7 is a side view of a drive system according to another embodiment.

FIG. 7a is a cross sectional view of a drive system according to another embodiment.

Figure 1:
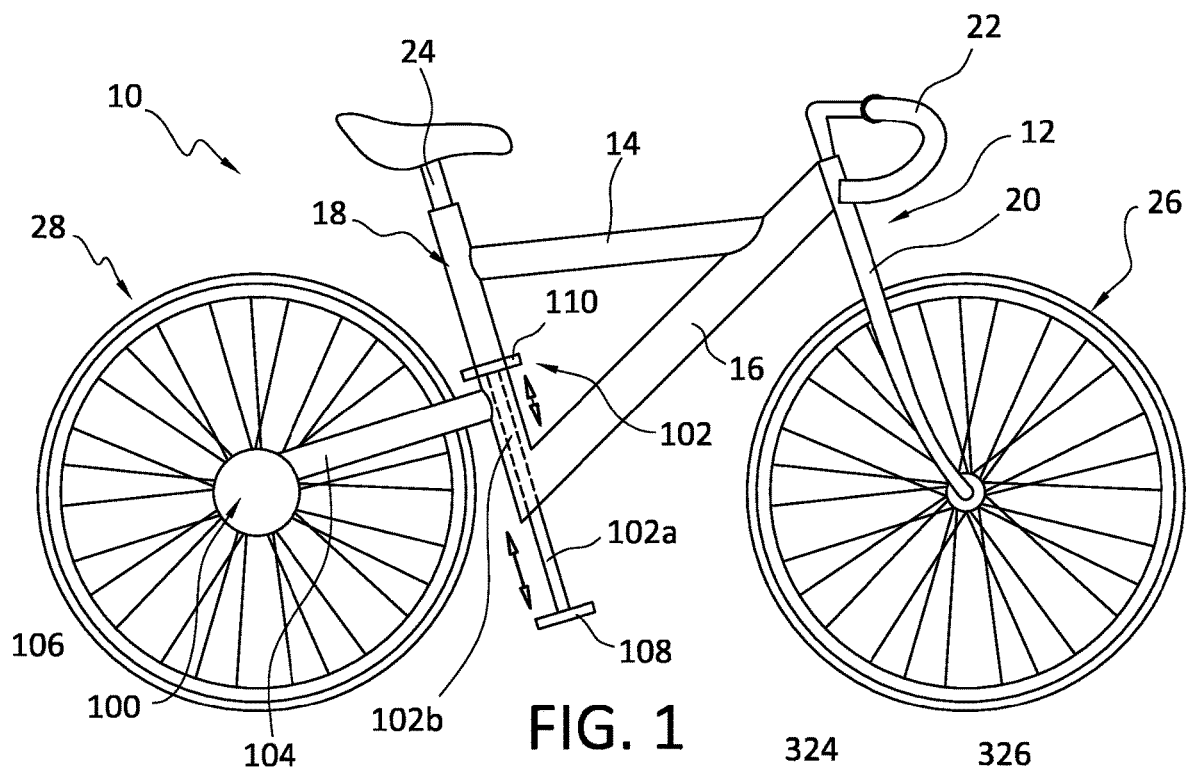
FIG. 1 is a side view of a bicycle including a drive system according to an embodiment.

The drawing figures are not necessarily drawn to scale, but instead are drawn to provide a better understanding of the components, and are not intended to be limiting in scope, but to provide exemplary illustrations.

DETAILED DESCRIPTION OF VARIOUS EMBODIMENTS

A better understanding of different embodiments of the disclosure may be had from the following description read with the accompanying drawings in which like reference characters refer to like elements.

While the disclosure is susceptible to various modifications and alternative constructions, certain illustrative embodiments are in the drawings and are described below. It should be understood, however, there is no intention to limit the disclosure to the specific embodiments disclosed, but on the contrary, the intention covers all modifications, alternative constructions, combinations, and equivalents falling within the spirit and scope of the disclosure.

It will be understood that unless a term is expressly defined in this application to possess a described meaning, there is no intent to limit the meaning of such term, either expressly or indirectly, beyond its plain or ordinary meaning.

Embodiments of the present disclosure advantageously provide a drive system for bicycles that incorporates certain design improvements over other systems for streamlined and more efficient operation of a bicycle. FIG. 1 shows a bicycle 10 including a drive system 100. The bicycle 10 is shown as a conventional two-wheel bicycle but can be tricycle, stationary exercise, device, or the like.

The bicycle 10 includes a bicycle frame 12 having a top tube 14, a down tube 16, and a seat tube 18. The bicycle frame 12 further can include a front fork 20, handlebars 22, and a seat post 24. A front wheel 26 can be attached to the front fork 20 and a rear wheel 28 can be attached to the frame 12 via at least one drive shaft described below and/or a seat stay (not shown). It will be appreciated that the frame 12 can be formed of carbon fiber, steel, titanium, combinations thereof, or any other suitable material.

The drive system 100 includes a pair of drive assemblies 102 located in or near the seat tube 18, at least one drive shaft 104 operably coupled to the drive assemblies 102, and at least one drive plate 106 on the rear wheel 28 configured to interact with the at least one drive shaft 104. The at least one drive shaft 104 extends generally in a direction between the seat tube 18 and the rear wheel 28. As described below, the drive system 100 can provide an in-frame, high-efficiency, pedal system without the use of chains or chainrings. The drive assemblies 102 can comprise pump mechanisms, linear drive systems, or any other suitable drive assemblies.

In use, a rider positions his or her legs on opposite sides of the frame 12, with his or her feet positioned on pedal members 108, 110 of the drive assemblies 102a, 102b. The rider depresses one pedal member 108, which, in turn, causes the drive assembly 102a to move linearly or down relative to the seat post 24. The interaction between the drive assembly 102a and the at least one drive shaft 104 is such that the linear or downward movement of the drive assembly 102a causes the at least one drive shaft 104 to rotate, which in turn, rotates and transmits power to the rear wheel 28 and moves the opposing drive assembly 102b linearly or upwardly.

When the pedal member 108 reaches the bottom of its stroke, the pedal member 110 is in a readily depressible position. The rider then pushes down on the other pedal member 110 and the opposing drive assembly 102b causes the at least one drive shaft 104 to rotate. This transmits power to the rear wheel 28 in the same manner as previously described.

In this manner, a driving or propelling force is applied to the rear wheel 28 when either the left or right pedal members 108, 110 is moved linearly or pushed downwardly. The rider's full force is applied vertically downward on the pedal members 108, 110 and transmitted through the at least one drive shaft 104 to the rear wheel 28. This more efficiently transfers energy from the rider to the rear wheel 28 than in prior art rotary pedaling systems.

In addition, the drive system 100 provides the rider the capability to choose the travel distance of each pedal member 108, 110 in each stroke. For instance, where terrain is steep, or the rider is tired, the rider can make a shorter, more leveraged pedal stroke. This advantageously eliminates the need for a long, circular stroke, with much of the pedaling motion finding the rider's legs contracted and poorly leveraged.

According to a variation, the at least one drive shaft 104 can form chain stays extending between the at least one drive plate 106 and the seat tube 18. Further, the drive system 100 eliminates several traditional bicycle parts such as the forward sprocket or chainring, crankshaft, rear sprocket, cog, crank arms, and chain, simplifying the construction of the bicycle 10 and enhancing its aesthetic appeal, weight savings, and/or suspension capabilities. The drive system 100 can also significantly reduce friction by reducing contact points between moving parts. For example, the drive system 100 eliminates many contact points such as chain links, derailleur wheels, chainrings, and gear cog sets on a conventional bicycle design. As such, the drive system 100 advantageously and efficiently converts linear movements of the drive assemblies into rotation of the rear wheel without a chain and chainring.

Figure 2:
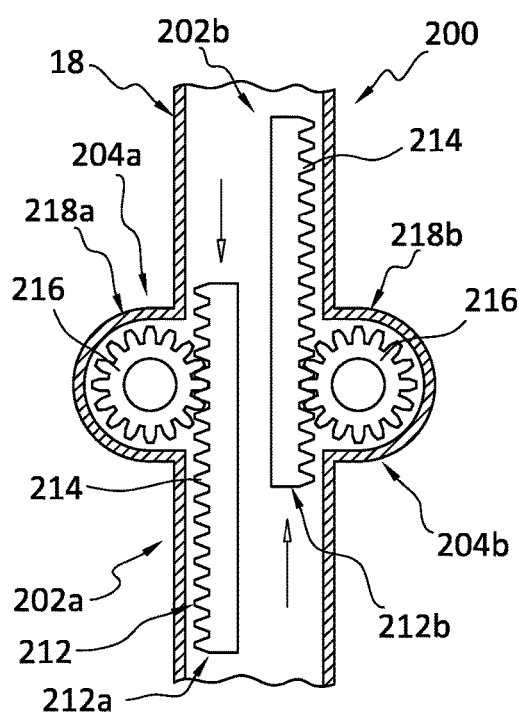
FIG. 2 is a detailed cross section view of a drive system according to an embodiment.

Various exemplary embodiments of the drive system and rear wheel of the present disclosure are illustrated in FIGS. 2-5. In FIG. 2, a drive system 200 includes a pair of drive assemblies 202a, 202b located on, in, or near the seat tube 18 and first and second drive shafts 204a, 204b extending in a general direction between the seat tube 18 and the rear wheel 28. In this embodiment, each of the drive assemblies 202a, 202b includes a rack drive member 212 having an outer side defining a plurality of teeth 214 arranged to interact with a plurality of teeth 216 defined drive gears 218a, 218b of the drive shafts 204a, 204b. The rack drive members 212a, 212b can be located inside the seat tube 18.

As shown, the teeth 216 on the rack drive members 212a, 212b are formed along the outer side of the rack drive members 212a, 212b and extend in opposite directions. A longitudinal axis of the rack drive members 212a, 212b can be substantially oriented in a same direction as the seat tube 18. The combination of the rack drive members and the drive gears 218a, 218b help facilitate the pumping motion of the drive assemblies to provide a chainless, drive system. The drive gears 218a, 218b can comprise pinions or other suitable drive gears.

In use, as a rider pushes one drive assembly 202a downward, the toothed interaction between the rack drive member 212a and the drive gear 218a causes the first drive shaft 204a to rotate in a first direction. This rotation of the first drive shaft 204a in the first direction rotates and transmit power to the rear wheel 28, which, in turn, rotates the second drive shaft 204b in the first direction.

As the second drive shaft 204b rotates in the first direction, the toothed interaction between the drive gear 218b and the rack drive member 212b moves the drive assembly 202b upward to a readily depressible position.

According to a variation, the drive gears 218a, 218b have a one-way ratchet configuration. This allows the input of power to be directed to the drive shafts 204a, 204b while allowing the drive shafts 204a, 204b to spin while the rider rests from pedaling or pumping.

As in the previous embodiment, the rider's full force is applied vertically downward on pedal members (e.g., 108, 110) and transmitted through at least one of the drive shafts 204a, 204b to the rear wheel 28. There is beneficially no or little lost motion such as in rotary pedaling systems. In addition, the drive system 200 provides a rider the capability to choose the travel distance of each pedal member in each stroke.

Figure 3:
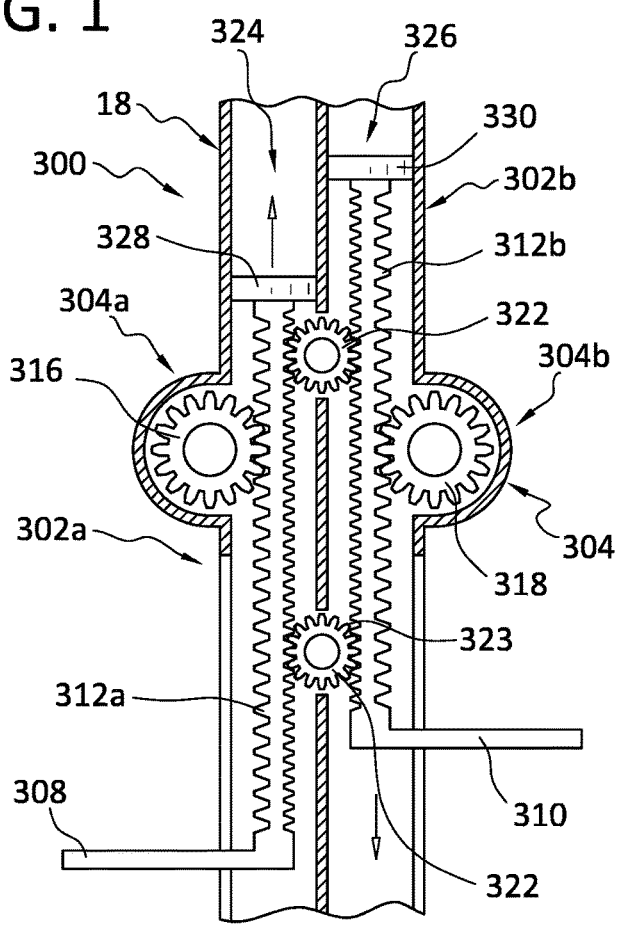
FIG. 3 is a detailed cross section view of a drive system according to another embodiment.

In FIG. 3, a drive system 300 include first and second drive shafts 304a, 304b and a pair of drive assemblies 302a, 302b positioned between the drive shafts 304a, 304b on the seat tube 18. The drive shafts 304a, 304b extend in a direction between the rear wheel 28 and the seat tube 18. The drive assemblies 302a, 302b include pedal members 308, 310 operably connected to a set of rack drive member 312a, 312b. The rack drive members 312a, 312b are shown located inside of the seat tube 18 but can be located outside of the seat tube 18. For instance, the rack drive members 312a, 312b can be located outside of the seat tube 18 and housed within protective covers.

The rack drive members 312a, 312b have an outer side defining a first set of teeth and an inner side defining a second set of teeth. The first teeth are arranged to interact with a plurality of teeth 316 defined on gear members or drive gears 318 of the drive shafts 304a, 304b. The drive gears 318 can be located at least in part outside the seat tube 18. It will be appreciated that the drive system 300 can work and can include the same or similar features described in relation to other embodiments.

At least two gear members 322 are positioned between the rack drive members 312a, 312b. Each gear member 322 defines a plurality of teeth 323 arranged to interact or mesh with the second teeth of the rack drive members 312a, 312b. For instance, downward movement of the first rack drive member 312a drives rotation of the gear members 322 in one direction, which drives the second rack drive member 312b upward and into a readily depressible position. Likewise, downward movement of the second rack drive member 312b drives rotation of the gear members 322 in the opposite direction, which drives the first rack drive member 312a upward and into a readily depressible position. The gear members 322 thus help provide linear thrust and motion to the rack drive members 312a, 312b and power output to the rear wheel 28 as discussed above. In addition, the gear members 322 can stabilize and guide movement of the rack drive members 312a, 312b. According to a variation, the drive gears 318 be omitted or can comprise follower gears and at least one drive shaft 304 is operably coupled to at least one of the gear members 322 to drive rotation of the rear wheel 28.

In an embodiment, the seat tube 18 defines a pair of chambers 324, 326, each carrying a piston member 328, 330. The drive assemblies 302a, 302b can be operably connected to the piston members 328, 330 such that linear or up and down movement of the drive assemblies 302a, 302b relative to the seat tube 18 drives the piston members 328, 330 within the chambers 324, 326 to compress and move air within the frame 12 for powering and/or braking the rear wheel 28. As seen, the piston members 328, 330 and the drive assemblies 302a, 302b can be incorporated inside of the seat tube 18. This advantageously uses this conventionally unused space within the seat tube 18, reducing the overall size of the bicycle 10. It also enhances the aerodynamics of the bicycle 10 by protecting at least the piston members 328, 330 and the drive assemblies 302a, 302b from wind resistance. Further, incorporating these components inside of the seat tube 18 helps maintain the aesthetic appeal of the bicycle 10. Optionally, the piston members 328, 330 can be selectively disengaged from the drive assemblies 302a, 302b, helping to reduce resistance during use. For instance, at least one of the piston member can be configured to selectively disengage from the corresponding drive assembly during an up-stroke, reducing resistance within the drive system 300.

Figure 4:
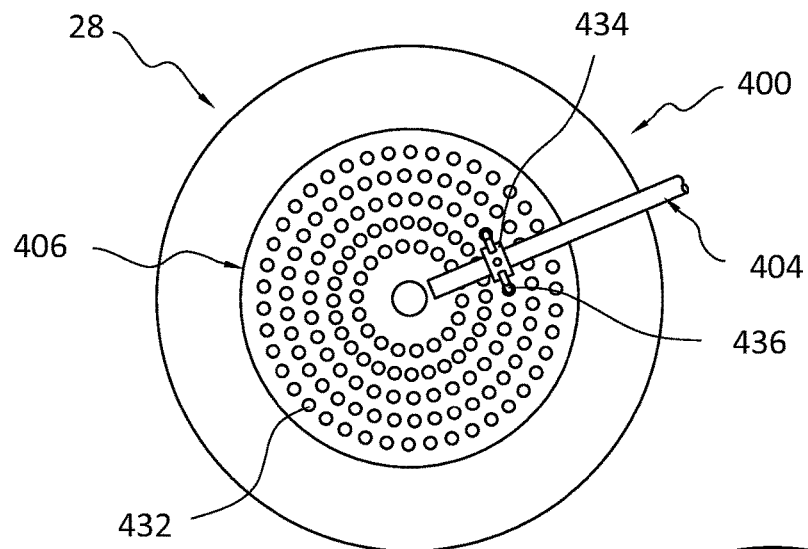
FIG. 4 is a side view of a rear wheel assembly according to an embodiment.

FIG. 4 illustrates a side view of rear wheel 28 of the bicycle according to another embodiment. While one side of the rear wheel 28 is shown, it will be appreciated that in other embodiments, the other side of the rear wheel 28 can be similar or different. For instance, a drive plate can be located on both sides of the rear wheel 28.

A drive shaft 404 extends in a direction between the rear wheel 28 and the seat tube 18 (shown in FIG. 1). The rear wheel 28 is operably connected to a drive unit or drive plate 406 defining a plurality of a holes 432 therein. The drive plate 406 can comprise a disk extending radially from an axle toward a rim of the rear wheel 28. The drive plate 406 can be smooth and flat rather than with protruding gears or teeth as in the prior art, improving the aerodynamics of the drive plate 406. In an embodiment, the holes 432 are distributed in a plurality of circular patterns of different diameters. Each circular pattern is configured to provide a different gearing of the rear wheel 28 (i.e., more torque or less velocity). For instance, the smaller circular patterns can provide higher gearing and the larger circular patterns and provide lower gearing. It will be appreciated that the diameter of the drive plate 406 and/or the hole patterns and/or shapes can be varied to offer different gear ratios. The drive plate 406 can be configured to accommodate a disc brake system. The rear wheel 28 can be arranged to rotate with and independent of the drive plate 406.

A drive sleeve 434 is carried on the drive shaft 404 and includes a plurality of pegs 436 or pins arranged to selectively interact with the holes 432 to drive rotation of the rear wheel 28. In an embodiment, the pegs 436 can define rounded ends portions and are selectively extendable from the sleeve 434 and retractable into the sleeve 434. For instance, the pegs 436 can be selectively extendable through centrifugal forces and retractable through a reduction of centrifugal force from, for example, a reduced power input from the drive shaft 404. In other embodiments, the pegs 436 can be selectively retractable via one or more magnets positioned on the drive shaft 404. The sleeve 434 is configured to slide along the drive shaft 404 to change gear ratios at a rider's command. It will be appreciated that movement of the sleeve 434 and/or the pegs 436 can be controlled via a shifting mechanism operably coupled thereto and easily accessible to a rider.

The holes 432 in the drive plate 406 beneficially reduce the weight of the drive plate 406 and drive system 400 to provide different gear ratios rather than adding weight with a cog set or cassette as in the prior art. Additionally, because the drive plate 406 is flat or substantially flat, there is reduced or little aerodynamic drag as wind resistance from the drive plate 406.

In use, the pegs 436 can be initially retracted in the sleeve 434 and will extend outward to interact with a selected grouping of holes 432 in the drive plate 406 through centrifugal force generated by rotation of the drive shaft 404. Through operation of the shifting mechanism, the pegs 436 can be retracted to disengage from the holes 432, and the sleeve 434 can be moved along the drive shaft 404 to shift from one grouping of holes 432 to other groupings of holes 432 in the drive plate 406. The rounded heads or ends of the pegs 436 can enhance a smooth shifting action. Moreover, with the assistance of magnets spaced along the drive shaft 404, the sleeve 434 can smoothly and efficiently shift between the hole groupings or gear ratios. In other embodiments, the drive plate 406 can be omitted. For instance, the sleeve 434 and the pegs 436 can be configured to interact with a modified rear cassette.

Figure 4A:
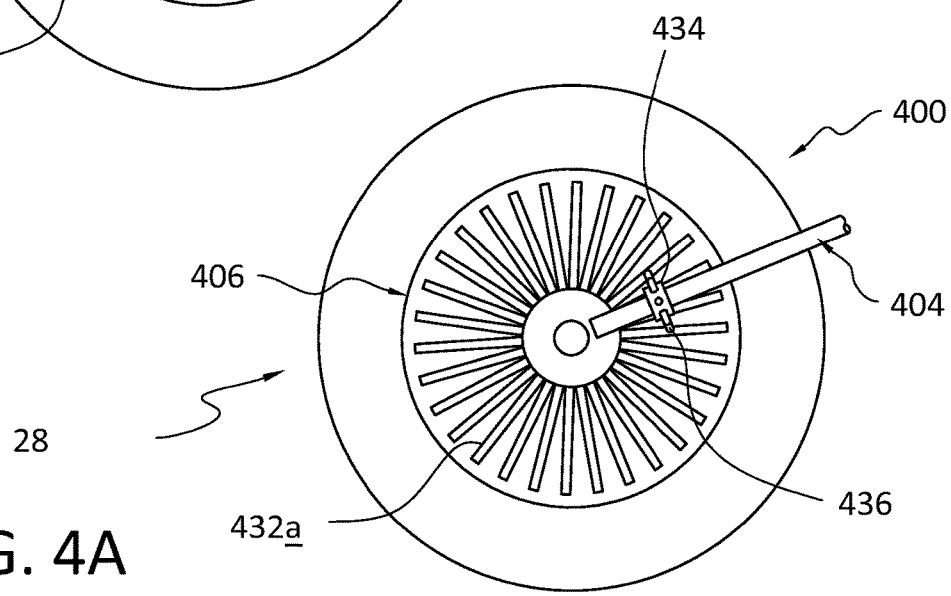
FIG. 4A is a side view of a rear wheel assembly according to another embodiment.

According to a variation, the holes can comprise radially extending slots 432a formed in the drive plate 406 as shown in FIG. 4A. The pegs 436 can be configured to interact with the slots 432a to drive rotation of the rear wheel 28. For instance, as the sleeve 434 slides along the drive shaft 404, the pegs 436 can slide along and interact with different portions of the slots 432a to change gear ratios at the rider's command. This beneficially can reduce the weight of the drive plate 406 and provide for smoother shifting. It also eliminates the need for the pegs 436 to fully retract into the sleeve 434 as they can slide along the slots 432a to change gears. In an embodiment, the slots 432a can have a uniform width along a length of the slot extending from a center of the drive plate 406.

Figure 5:
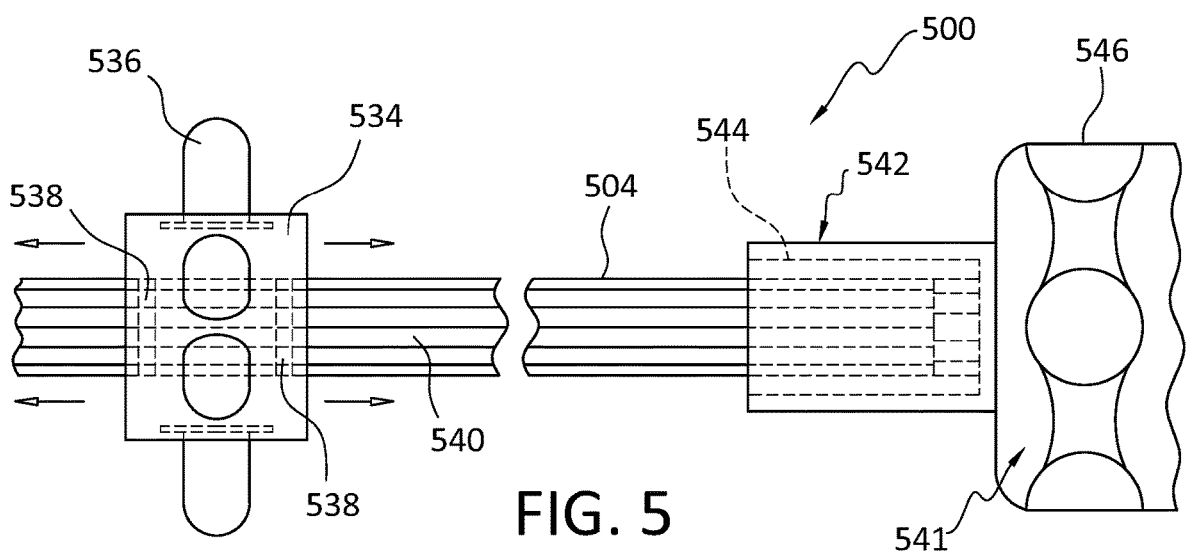
FIG. 5 is a detailed side view of a drive system according to another embodiment.

FIG. 5 illustrates a drive system 500 according to yet another embodiment including a drive shaft 504 that can move up and down and vary in length. Like the previous embodiment, the drive shaft 504 carries a drive sleeve 534 with pegs 536 and magnets 538 and extends in a direction between the seat tube 18 and the rear wheel 28. The drive shaft 504 defines a plurality of axially extending splines 540. The splines 540 can comprise ridges or teeth. A connection 541 between the drive shaft 504 and drive gears or gear members is formed in part by a slip yoke 542 including a plurality of internal splines 544 interacting with the splines 540, and a u-joint 546. The internal splines 544 can comprise ridges or teeth. The interaction between the drive shaft 504 and the slip yoke 542 allows for axial displacement therebetween, which gives the drive shaft 504 the ability to lengthen and shorten between the rear wheel 28 and the drive assemblies. Further, the u-joint 546 allows the drive shaft 504 to flex or move up and down.

The ability of the drive shaft 504 to both move and power the rear wheel 28 advantageously solves the problem of fixed length and rigid structures used on prior art bicycles such as seat stays, chain stays, and suspension systems by eliminating the need to maintain tension in chain. It also can provide or assist in suspension to the bicycle 10 as it allows the rear wheel 28 to absorb energy and move up and down relative to the frame 12 of the bicycle 10. In short, by using a combination of splines, slip yokes, and u-joints, the drive shaft 504 can vary in length, and move up and down to allow it to function as a drive shaft, and seat stays and shock absorbers, combining all three components into a single unit. According to an embodiment, at least one shock absorber can be combined with a flexible drive shaft of the present disclosure. For instance, the bicycle 10 can include a shock absorber fork on the rear wheel 28, and the drive shaft 504 having a flexible configuration and one chain stay extending between the seat tube 18 and the rear wheel 28. The drive shaft 504 and the chain stay can extend from between a lower and/or a middle portion of the seat tube 18 toward the rear wheel 28. In an embodiment, the combination of the drive shaft 504 and the chain stay can replace conventional seat stays and chain stays.

FIG. 6 illustrates a bicycle 10a including a drive system 600 according to yet another embodiment having one or more drive assemblies 602 and at least one drive shaft 604 extending in a direction between a rear wheel 28a and a seat tube 18a. The at least one drive shaft 604 can extend in a direction between the rear wheel 28a and an upper end of the seat tube 18a. As in the previous embodiment, the rider's full force is applied vertically downward on pedal members of the drive assembly 602 and transmitted through the at least one drive shaft 604 to the rear wheel 28a. There is beneficially no or little lost motion as in prior art rotary pedaling systems. In addition, the drive system 600 provides a rider the capability to choose the travel distance of each pedal member in each stroke.

As seen, the at least one drive shaft 604 forms at least part of the seat stays 605 of the bicycle 10a. Like the previous embodiment, the at least one drive shaft 604 is configured to vary in length and carries a drive sleeve 634 with pegs 636 that interact with a plurality of holes formed in a drive plate 606 of the rear wheel 28a. In the illustrated embodiment, the seat stays 605 comprise the at least one drive shaft 604 extending through and extending between a tubular member of the frame 12a of the bicycle 10a and the rear axle of the drive plate 606.

Because the drive shaft 604 has a variable length and forms at least part of a portion of the seat stays 605, the seat stays 605 can also have a variable length rather than being a fixed length as in the prior art. It also allows the drive shaft 604 to provide suspension to the rear wheel 28a. For instance, the drive shaft 604 can comprise a damper or shock absorber that permits the rear wheel 28a to move up and down to absorb small bumps while keeping the rear wheel 28a in contact with the ground for better control. In addition, this helps a rider and the bicycle 10a absorb larger shocks when landing jumps. As such, it will be appreciated that the drive systems of the present disclosure can replace seat stays and/or chain stays on conventional bicycle frames.

FIG. 7 illustrates a drive system 700 according to yet another embodiment. As previously discussed, the drive system embodiments can include one or more drive shafts. In the illustrated embodiment, the drive system 700 includes a single drive shaft 704 including a drive gear 716 arranged to interact with the rack drive members 712 of the drive assemblies 702 and power the rear wheel. The drive gear 716 can be located along a side of the seat tube 18b and configured to be rotated by the up and down movement of the rack drive members 712 which are in a front and back arrangement inside the seat tube 18b as best shown in FIG. 7a. To facilitate the reciprocating movement of the drive assemblies 702, a follower gear 718 can be interposed between one of the rack drive members 712 and the drive gear 716 so that the drive assemblies 702 reciprocate rather than move in the same direction. The drive gear 716 can comprise a pinon gear or any other suitable gear.

In other embodiments, the drive gear 716 can be positioned between the rack drive members 712 which are in a side-by-side arrangement inside of the seat tube 18*b*. The drive gear 716 is configured to interact with teeth formed on the inner sides of the rack drive members 712. As the rack drive members 712 move linearly or up and down as described above, the interaction between the rack drive members 712 and the drive gear 716 can rotate the drive shaft 704 and power the rear wheel of the bicycle. According to a variation, a bearing assembly can be located above or below the drive gear 716 to help stabilize movement of the rack drive members 712 within the seat tube 18*b*.

Figure 8:
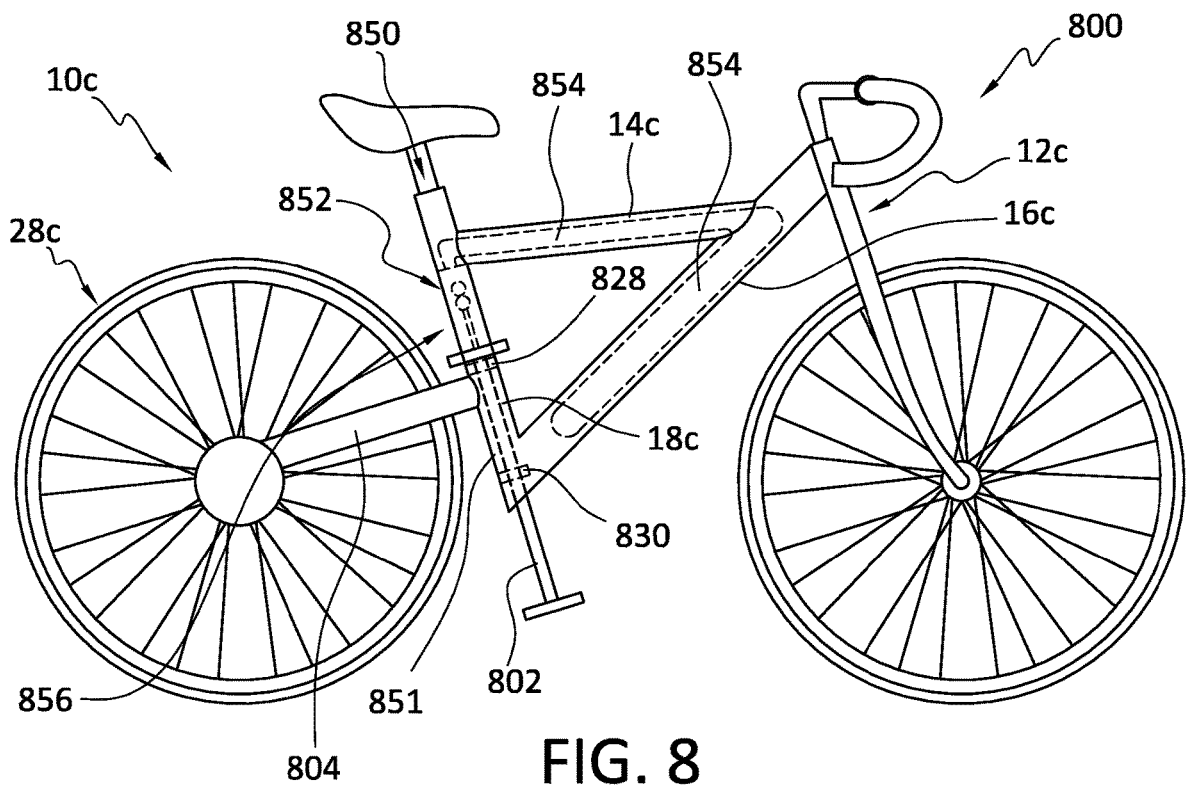
FIG. 8 is a side view of a bicycle including a drive system according to another embodiment.
Figure 9:
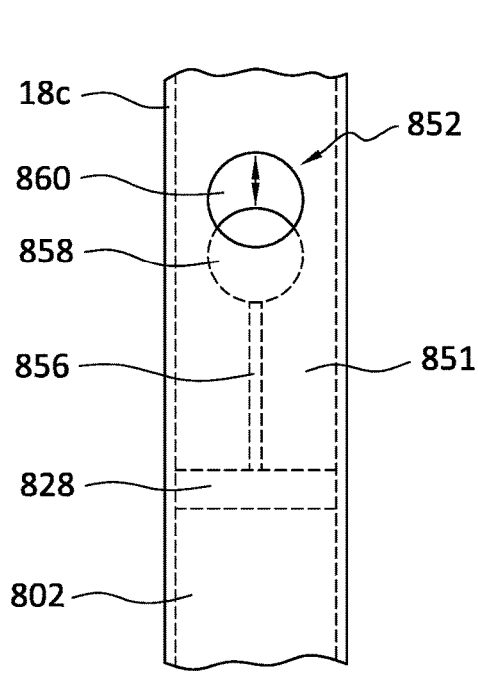
FIG. 9 is a detailed view of the drive system in FIG. 8.

FIGS. 8 and 9 illustrate a bicycle 10*c* including a drive system 800 according to yet another embodiment. The drive system 800 includes one or more drive assemblies 802 and at least one drive shaft 804. As in the previous embodiment, the rider's full force is applied vertically downward on pedal members of the one or more drive assemblies 802 and transmitted through the at least one drive shaft 804 to the rear wheel 28*c*. There is beneficially no or little lost motion such as in rotary pedaling systems. In addition, the drive system 800 provides a rider the capability to choose the travel distance of each pedal member in each stroke. It will be appreciated that the one or more drive assemblies 802 can be configured to similar to any of the drive assemblies described herein.

In the illustrated embodiment, the drive system 800 comprises a fluid drive system 850 operatively coupled to the drive assemblies 802. Optionally, the fluid drive system 850 is selectively coupled to the drive assemblies 802. The fluid drive system 850 is arranged to compress and store fluid (e.g., air) inside the frame 12*c* of the bicycle 10*c*, permitting a rider to safely and efficiently store kinetic energy when descending a grade, braking, or at any other time as desired. The stored energy can then be used during descents, acceleration, or simply to add supplemental power at the rider's command. By utilizing compressed fluid or air inside of the frame 12*c* to store and supply energy, the fluid drive system 850 provides a lightweight energy source. Further, the need for heavy, expensive, and complicated components such as prior art batteries and motors is eliminated or significantly reduced, improving the efficiency of the bicycle 10*c*.

The fluid drive system 850 includes a pair of pistons 828, 830 positioned inside of the seat tube 18*c* that are operably coupled to the drive assemblies 802 and arranged to selectively compress or draw fluid such as air or hydraulic fluid within fluid chambers 851 defined within the seat tube 18*c*. The fluid chambers 851 are shown as first and second fluid chambers 851 coaxially located along a length of the seat tube 18*c* but can be in any suitable configuration. For instance, the fluid chambers can include a first intake fluid chamber fluidly chamber configured to receive air from the environment and a second exhaust fluid chamber configured to expel air from the fluid drive system 850 to the environment. In other embodiments, the fluid chambers can include one, two, three, four, or any other suitable number of fluid chambers.

In an embodiment, the seat tube 18*c* has a cylindrical shape and the shape of the fluid chambers 851 generally correspond to the shape of the seat tube 18*c*. This beneficially eliminates the need for a separate fluid or compression chamber as the frame 12*c* itself defines the fluid chamber 851.

In other embodiments, the shape of the fluid chambers and the seat tube 18*c* can be different or different from one another. The fluid chambers can be defined above and/or below the pistons 828, 830 within the seat tube 18*c*. It will be appreciated that the pistons 828, 830 can be operatively coupled to the drive assemblies 802 via any suitable linkage such as a piston rod, tether, compression transfer element, or other component.

Within the fluid chambers 851, the pistons 828, 830 are driven up and down by the pumping motion of the drive assemblies 802, which, in turn, pressurizes fluid (e.g., air) in the fluid chambers 851 and forces it through a valve system 852 to one or more bladders 854 housed within the frame 12*c*. The bladders 854 are sized and configured to store, regulate, and/or supply compressed fluid within the fluid drive system 850, which can then be used to drive or resist rotation of the rear wheel 28*c*. It will be appreciated that the bladders 854 can be formed of any suitable material and may include welds and/or other features to direct the movement of fluid or air through the bladders 854. According to a variation, the bladders 854 can be interchangeable or removable from the frame 12*c* to vary the energy or storage capacity of the fluid drive system 850. For instance, if a rider is planning on a mountain ride with steep descents, larger bladders can be positioned inside the frame 12*c* for increased breaking capability.

The valve system 852 is configured to control the movement of air or fluid within the frame 12*c* or the fluid drive system 850 between the fluid chambers and the bladders 854. The valve system 852 can also regulate pressure within the fluid drive system 850. For instance, the valve system 852 can comprise an intake or release valve configured to open at a target pressure, which, in turn, regulates pressure within the fluid drive system 850. It will be appreciated that the valve system 852 can be separate from the bladders 854 or integrated with the bladders 854. In other embodiments, the valve system 852 can be integrated with the drive assemblies 802 or separate from the drive assemblies 802.

The valve system 852 can include control valves, check valves, pressure relief valves, sliding valves, one-way valves, two-way valves, flapper valves, electronic valves, combinations thereof, or any other suitable valve type. For instance, as shown in FIG. 9, the valve system 852 can include a sliding valve 858 arranged to open and close a port 860 formed in the frame 12*c* that is in fluid communication with one or more of the fluid chambers and the bladders 854.

When the piston 828 or 830 and the drive assembly 802 move downward within the seat tube 18*c*, the downward movement of the piston 828 or 830 can move or slide the sliding valve 858 downward via a linkage 856 to unseal the port 860 such that air can enter the fluid chamber 851 from the bladders 854. When the piston 828 or 830 and the drive assembly 802 move upward within the seat tube 18*c*, the upward movement of the piston can move or slide the sliding valve 858 upward to seal off the port 860 such that fluid communication between the bladder 854 and the fluid chamber 851 is prevented.

In other embodiments, the valve system 852 can comprise a cam mechanism that rotates upon movement of the pistons 828, 830 to selectively activate and deactivate the valve system 852. In other embodiments, the drive assembly 802 can include rack or ladder members that slide up and down within the seat tube 18*c* to physically open and close the ports 860. In other embodiments, at least one of the pistons 828, 830 can be attached to the linkage 856 via an attachment point (e.g., a pin member or post) slidably positioned within a slot defined in the piston 828 or 830. During an upstroke of the piston 828 or 830, the attachment point pushes the linkage 856 upward until a power port associated with the linkage 856 and the port 860 align, which, in turn, allows compressed air into the fluid chambers 851. Then as the piston 828 or 830 goes into a downstroke, the attachment point slides within the slot until it reaches the end of the slot, which, turn, causes the linkage 856 to move and close the ports.

It will be appreciated that valve system 852 can selectively direct movement of fluid or air within the fluid chambers 851 to help control the reciprocating motion of the drive assemblies 802, which in turn helps control rotation of the rear wheel 28*c*. For instance, when the piston 828 starts to move downward, the valve system 852 can allow air to be released into a first fluid chamber 851 via a first port to exert a downward force on the piston 828 and a first drive assembly, while preventing air from entering a second fluid chamber 851 via a second port to reduce resistance to upward movement of the piston 830 and a second opposing drive assembly.

When the second drive assembly starts to move downward on the next stroke, the valve system 852 can allow air to be released into the second fluid chamber 851 via the second port to exert a downward force on the piston 830 and the second drive assembly, while preventing air from entering the first fluid chamber via the first port to reduce resistance to upward movement of the piston 828 and the first drive assembly.

As noted above, the bladders 854 are configured at least in part to store and/or supply compressed air within the fluid drive system 850. For instance, via controls or other input mechanism associated with the valve system 852, compressed air from the bladders 854 can be selectively supplied from the bladders 854 back into the fluid chambers 851 to provide a resistance to movement of the pistons 828, 830, which provides a resistance to the pumping drive assemblies 802, which in turn, provides a resistance to the rotation of the at least one drive shaft 804. This is turn provides a resistance to the rotation of the rear wheel 28*c*.

Likewise, via controls or other input/output mechanism associated with the valve system 852, compressed air from the bladders 854 can be selectively supplied from the bladders 854 back into the fluid chambers 851 to provide an increased driving force to provides additional power to the rotation of the at least one drive shaft 804. This is turn provides additional power to the rotation of the rear wheel 28*c*. The stored air in the bladders 854 can thus provide safe and lightweight braking or supplemental power to the bicycle 10*c* as needed by a rider. Optionally, the controls can include one or more displays configured to communicate operating conditions to the rider. For instance, the displays can include a pressure gauge communicated pressure levels within the bladders 854 to the rider.

According to a variation, the valve system 852 and bladders 854 can be configured to selectively draw a vacuum in the fluid chambers, which, in turn, can help draw or pull the drive assemblies 802 up and down and provide increased power to the rear wheel 28*c*. The one or more bladders 854 are shown extending through the top tube 14*c* and the down tube 16*c* of the frame 12*c* but can be located within any suitable part of the frame 12*c*. By locating the one or more bladders 854 and the pistons 828, 830 inside of the frame 12*c* which has been conventionally unused and vacant, the aerodynamic integrity of the bicycle 10*c* is maintained. Moreover, the simplicity of this arrangement and use of the inside of the frame 12*c* also helps maintain the aesthetic integrity and appeal of the bicycle 10*c*.

According to an embodiment, the one or more bladders 854 are configured to allow for constant input and output pressures and/or power from the one or more bladders 854. For instance, the bladders 854 can be configured such that pressurized air or other fluid will only enter and leave the one or more bladders 854 at selected target pressures sufficient to run the fluid drive system 850. Moreover, this can occur through storage and expenditure processes using the stored/compressed air energy. This advantageously can provide consistent, stable, safe, and concentrated air pressure to the fluid drive system 850 during the intake and expulsion cycles of air from the one or more bladders 854. Without the bladders 854, air would be compressed in a long, gradual process with increasing pressures until maximum capacity was achieved. Additionally, the useful air pressure would be spent at an early stage in the expulsion process and gradually lose pressure, power, and efficiency through the entire expulsion process. It will be appreciated that the fluid drive system 850 can be configured to control the amount of fluid and/or heat present in the fluid drive system 850 during use.

According to a variation, the bicycle 10*c* can include one or more shock absorbers for suspension, power assistance, and/or braking. For instance, the shock absorbers can be configured to operate using hydraulic oil and/or compressed air generated and/or supplied by the fluid drive system 850. In an embodiment, the shock absorbers can be fluidly connected to the bladders 854 and configured to compress and supply compressed air to the bladders 854, which, in turn, can be utilized for braking or powering the rear wheel. It will be appreciated that the seat tube 18C can have a circular, oval, square, or any other suitable cross-sectional shape. In an embodiment, a lower connection between the seat tube 18*c* and the frame 12*c* can be movably such that compressed air within fluid chamber 851 can be help provide shock absorption and/or suspension to the bicycle 10*c*.

Figure 10:
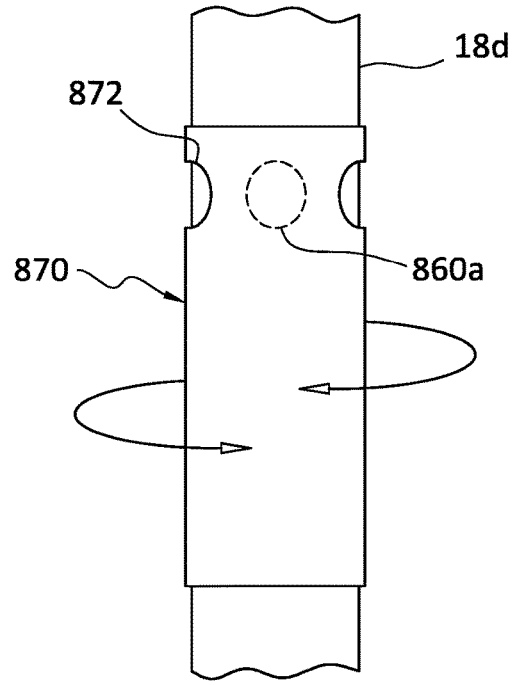
FIG. 10 is a detailed view of the drive system in FIG. 8 according to another embodiment.

According to a variation, the fluid drive system 850 and/or drive assemblies 802 can be selectively activated and/or deactivated. For instance, a sleeve member 870 can be rotatably located on the seat tube 18*d* as shown in FIG. 10. The sleeve member 870 can be configured to selectively activate the fluid drive system 850 and/or selectively disengage the drive assemblies 802 from the fluid drive system 850. For instance, the sleeve member 870 can define one or more external ports 872 configured to selectively align with a seat tube port 860*a* defined in the seat tube 18*d*. When sleeve member 870 is rotated into a first position, one of more of the external ports 872 can be selectively aligned with the seat tube port 860*a* and the pistons 828, 830 can be operably engaged with the valve system 852, which, in turn, selectively activates the fluid drive system 850.

When the sleeve member 870 is rotated into a second position, the seat tube port 860*a* can be blocked or sealed by the body of the sleeve member 870 and the pistons 828, 830 can be operably disengaged with the valve system 852, which, in turn, deactivates the fluid drive system 850 or disengages the fluid drive system 850 from the drive assemblies 802. This has the beneficial effect of reducing drag within the drive system 800. In other embodiments, the fluid drive system 850 can include one or spring members located within the seat tube 18*d*. The one or more spring members can be configured to help selectively engage and disengage the pistons 828, 830 from the valve system 852 and/or the drive assemblies 802.

Figure 11:
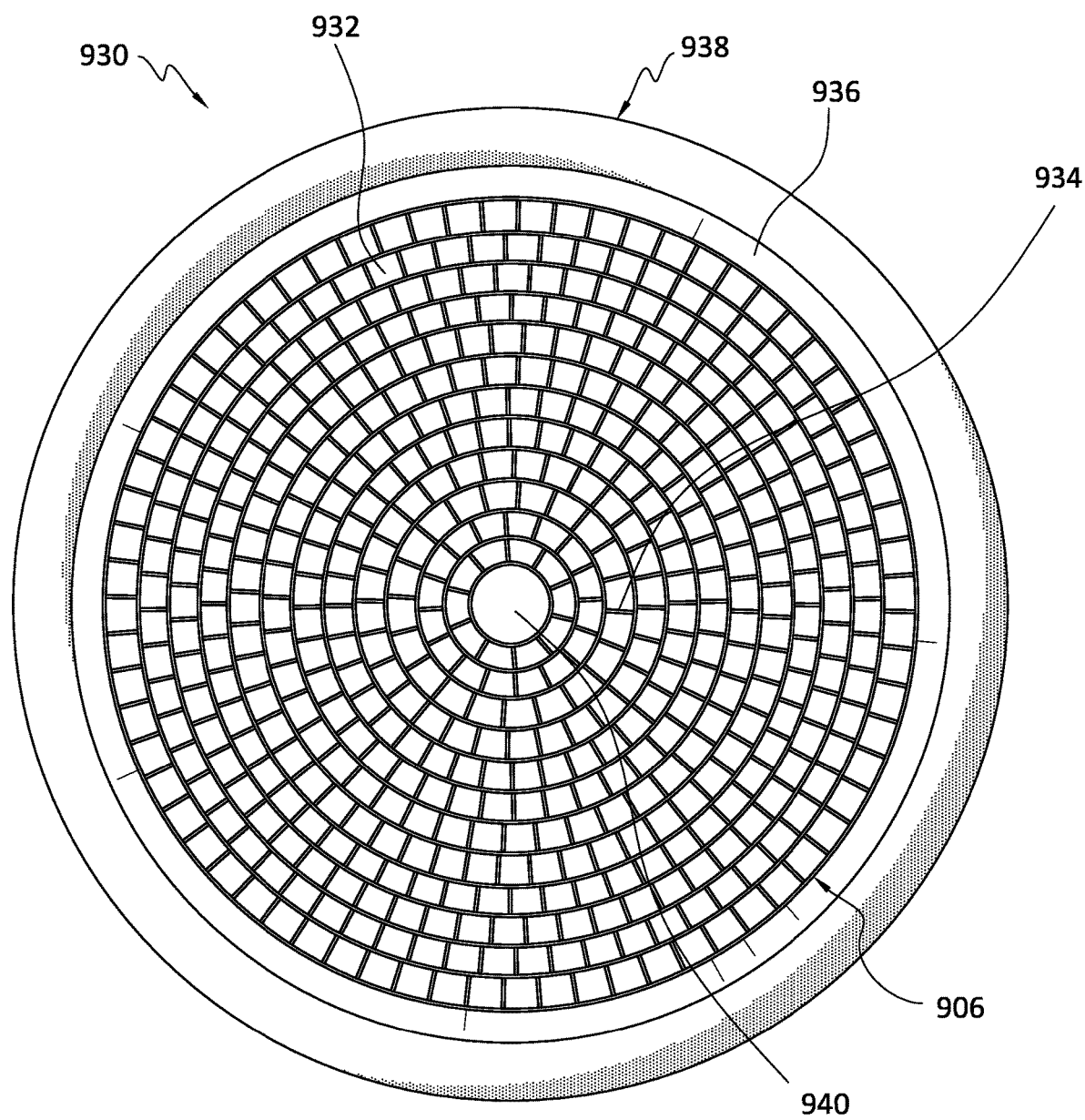
FIG. 11 is a side view of a rear wheel assembly according to another embodiment.

FIG. 11 is a side view of a rear wheel assembly according to yet another embodiment including a rear wheel 930 having a rim 936, a tire 938, and a plurality of web-like spokes 934 connecting the rim 936 to a hub 940 of the rear wheel 930. Like in other embodiments, the web-like spokes 934 define a drive unit having a plurality of holes 932 arranged to selectively interact with pins or pegs on a drive sleeve to drive rotation of the rear wheel 930. The holes 932 comprise gaps between the spokes 934 and can be distributed circumferentially and radially to provide different gearing of the rear wheel 930 as the drive sleeve moves along the drive shaft. In an embodiment, each hole 932 has a same size. This can help reduce the weight of the rear wheel 930 and enhance smoother shifting. In other embodiments, the size, shape, and/or pattern of the holes 932 can be varied to offer different gear ratios.

The various aspects and embodiments disclosed herein are for purposes of illustration and are not intended to be limiting. For instance, it will be appreciated that the gear members described herein can comprise any type of gear including, for example, spur gears, helical gears, bevel gears, spiral bevel gear, helical gears, and the like. In other embodiments, the drive plate can be omitted. For instance, the drive shaft can interact with a cassette or other element to drive rotation of the rear wheel.

Additionally, the words "including," "having," and variants thereof (e.g., "includes" and "has") as used herein, including the claims, shall be open-ended and have the same meaning as the word "comprising" and variants thereof (e.g., "comprise" and "comprises").

The invention claimed is:

1. A bicycle comprising:
a frame having a seat tube;
a rear wheel including a drive plate; and
a drive system configured to drive rotation of the rear wheel, the drive system comprising:
at least one drive shaft extending in a direction between the seat tube and the rear wheel and arranged to interact with the drive plate; and
a pair of drive assemblies located at least in part within the seat tube and arranged to operably interact with the at least one drive shaft, wherein each drive assembly includes a rack drive member configured to interact with a drive gear on the at least one drive shaft, wherein the drive assemblies are operably connected to piston members within the seat tube such that up and down motion of the drive assemblies drives the piston members to compress and move air within the frame for powering or braking the rear wheel.

2. A bicycle comprising:
a frame having a seat tube;
a rear wheel attachable to the frame and including a drive plate; and
a drive system configured to drive rotation of the rear wheel, the drive system comprising:
at least one drive shaft extending in a direction between the seat tube and the rear wheel and arranged to interact with the drive plate, wherein the at least one drive shaft includes a plurality of pegs arranged to interact with a plurality of holes formed in a drive plate to selectively drive rotation of the rear wheel; and
a pair of drive assemblies located near or at least in part within the seat tube and arranged to operably interact with the at least one drive shaft, wherein the at least one drive shaft converts linear motion of the drive assemblies into rotation of the rear wheel without a chain or chainring.

3. The bicycle of claim 2, wherein the wherein the drive plate has a flat configuration and defines a plurality of holes.

4. The bicycle of claim 3, wherein the plurality of holes comprises a plurality of radially extending slots formed in the drive plate.

5. The bicycle of claim 3, wherein the pegs are included on a sleeve selectively movable along a longitudinal axis of the drive shaft to vary gearing of the rear wheel.

6. The bicycle of claim 5, wherein the pegs are retractable into the sleeve.

7. The bicycle of claim 6, wherein the pegs are retractable via magnets spaced along the longitudinal axis of the drive shaft.

8. The bicycle of claim 6, wherein the pegs define rounded end portions arranged to facilitate insertion and removal of the pegs from the holes.

9. The bicycle of claim 2, wherein each drive assembly includes a rack drive member arranged to interact with a drive gear on the drive shaft.

10. The bicycle of claim 9, wherein the drive gear comprises a pinion defining teeth arranged to interact with teeth formed along the rack drive member.

11. The bicycle of claim 9, wherein the rack drive member is located inside of the seat tube.

12. The bicycle of claim 2, wherein the drive assemblies are operably connected to piston members within the seat tube such that up and down movement of the drive assemblies drives the piston members to compress and move air within the frame for powering or braking the rear wheel.

13. The bicycle of claim 12, further comprising one or more bladders positioned inside of the frame and arranged to store or supply compressed air within the frame to control rotation of the rear wheel.

14. The bicycle of claim 13, further comprising a valve system configured to control movement of the air within the frame between the one or more bladders and fluid chambers carrying the piston members.

15. The bicycle of claim 14, wherein the valve system is configured to regulate pressure within the frame.

16. A drive system for driving rotation of a rear wheel of a bicycle having a seat tube, the drive system comprising:
at least one drive shaft operably connected to the rear wheel and arranged to interact with a drive plate of the rear wheel, wherein the at least one drive shaft comprises a seat stay having a variable length configured to absorb shock and provide suspension to the rear wheel; and
a pair of drive assemblies near or at least in part within the seat tube and arranged to operably interact with the at least one drive shaft, wherein the at least one drive shaft converts linear motion of the drive assemblies into rotation of the rear wheel without a chain or chainring.

* * * * *